(12) United States Patent  
Sanderson (10) Patent No.: US 8,494,964 B1  
(45) Date of Patent: Jul. 23, 2013

(54) SOFTWARE AS A SERVICE VIA VIRTUALIZATION

(75) Inventor: Jordan Sanderson, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 631 days.

(21) Appl. No.: 12/367,388

(22) Filed: Feb. 6, 2009

(51) Int. Cl.  
*G06F 21/00* (2006.01)

(52) U.S. Cl.  
USPC ............. 705/51; 705/50; 705/77; 705/78; 705/79; 705/901; 705/902; 705/903; 705/904; 705/911; 380/227; 380/228; 380/229; 380/230

(58) Field of Classification Search  
USPC .................................... 705/50–79  
See application file for complete search history.

(56) References Cited

U.S. PATENT DOCUMENTS

| | | | | |
|---|---|---|---|---|
| 2008/0234047 | A1* | 9/2008 | Nguyen | 463/42 |
| 2009/0119644 | A1* | 5/2009 | de Vries et al. | 717/123 |
| 2009/0254587 | A1* | 10/2009 | Shlomai et al. | 707/104.1 |
| 2010/0122343 | A1* | 5/2010 | Ghosh et al. | 726/23 |

FOREIGN PATENT DOCUMENTS

JP 2004102398 A * 4/2004

OTHER PUBLICATIONS

Ugles et al. Identifying Relevant Frames in Weakly Labeled Videos for Training Concept Detectors. Jul. 7-9, 2008. Retrieved from IDS.*  
Ulges, A., et al., "Identifying Relevant Frames in Weakly Labeled Videos for Training Concept Detectors," Conference on Image and Video Retrieval, Proceedings of the 2008 International Conference on Content-Based Image and Video Retrieval, Jul. 7-9, 2008, pp. 9-16.

* cited by examiner

*Primary Examiner* — James A Reagan  
(74) *Attorney, Agent, or Firm* — Fenwick & West LLP (57) ABSTRACT

A system, method, and computer program product for managing limited-use software on a host computer having an operating system is disclosed. A software application can be installed in the operating system as a virtualized application using light weight virtualization technology. Rights usage information for the software application is received, the rights usage information comprising a rule describing permitted use of the software application on the host computer. A determination is made whether to enable the virtualized application based at least in part on the rights usage information. Responsive to the determination, the virtualized application is enabled to be executed on the host computer.

20 Claims, 5 Drawing Sheets

SOFTWARE AS A SERVICE VIA VIRTUALIZATION

BACKGROUND

1. Field of the Invention

This invention pertains in general to software rights management and in particular to deploying and managing software using virtualization.

2. Description of the Related Art

Software providers often desire to distribute software with limited rights to users. Examples of this include shareware, subscription-based software, and pay-per-use software. For example, a shareware version of a software product may be provided to a user free of charge for a limited time, such as 30 days. After the limited time has expired, the software should cease to function if the user does not purchase the software. Pay-per-use software may involve a user paying a fee each time the user executes the software, for example. Subscription-based software may involve a monthly or annual fee for use.

Usually, the software provider needs to handle the details of implementing the use limitations of the software. For example, the software provider may need to include code for disabling the software and presenting a purchase screen when a trial period ends. This requires additional development effort by the software provider. In some cases, the techniques used by the software provider for limiting use can be circumvented by users (e.g., a user modifies configuration files or registry settings associated with the software). In addition to implementing use limitations, the software developer may desire to track the use of its limited rights software.

Therefore, there is a need in the art for a way to provide software with limited rights to users that is convenient and effective for software developers and to track the use of this limited rights software.

BRIEF SUMMARY OF THE INVENTION

The above need is met by a system, method, and computer program product for managing limited-use software on a host computer having an operating system. A software application can be installed in the operating system as a virtualized application using light weight virtualization technology. Rights usage information for the software application is received, the rights usage information comprising a rule describing permitted use of the software application on the host computer. A determination is made whether to enable the virtualized application based at least in part on the rights usage information. Responsive to the determination, the virtualized application is enabled to be executed on the host computer.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
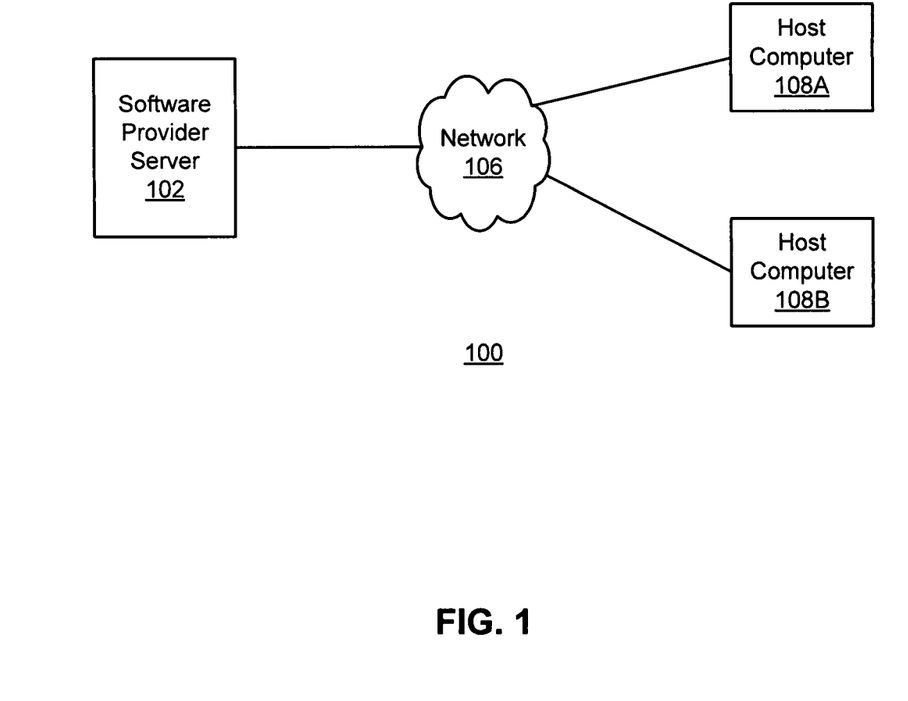
FIG. 1 is a high-level diagram illustrating a networked environment that includes a software provider server that provides limited-use software to host computers for execution on the host computers, in one embodiment.

FIG. 1 is a high-level diagram illustrating a networked environment 100 that includes a software provider server 102 that provides limited-use software to host computers 108 for execution on the host computers, in one embodiment. The software provider server 102 and the host computers 108 are connected by a network 106 such as a local area network or the Internet. Although only two host computers 108 are shown, a software provider server 102 may communicate with thousands of host computers 108. Additionally, a host computer 108 can receive software from multiple software provider servers 102.

The software provider server 102 may be operated by a software provider that creates packages containing software applications. These packages are deployed to the host computers. The host computers 108 execute the software applications as virtualized applications that can be easily and securely enabled and disabled based on software usage rights specified by the software provider server 102. The software provider server 102 can also track the actual usage of the software on the host computers 108.

Figure 2:
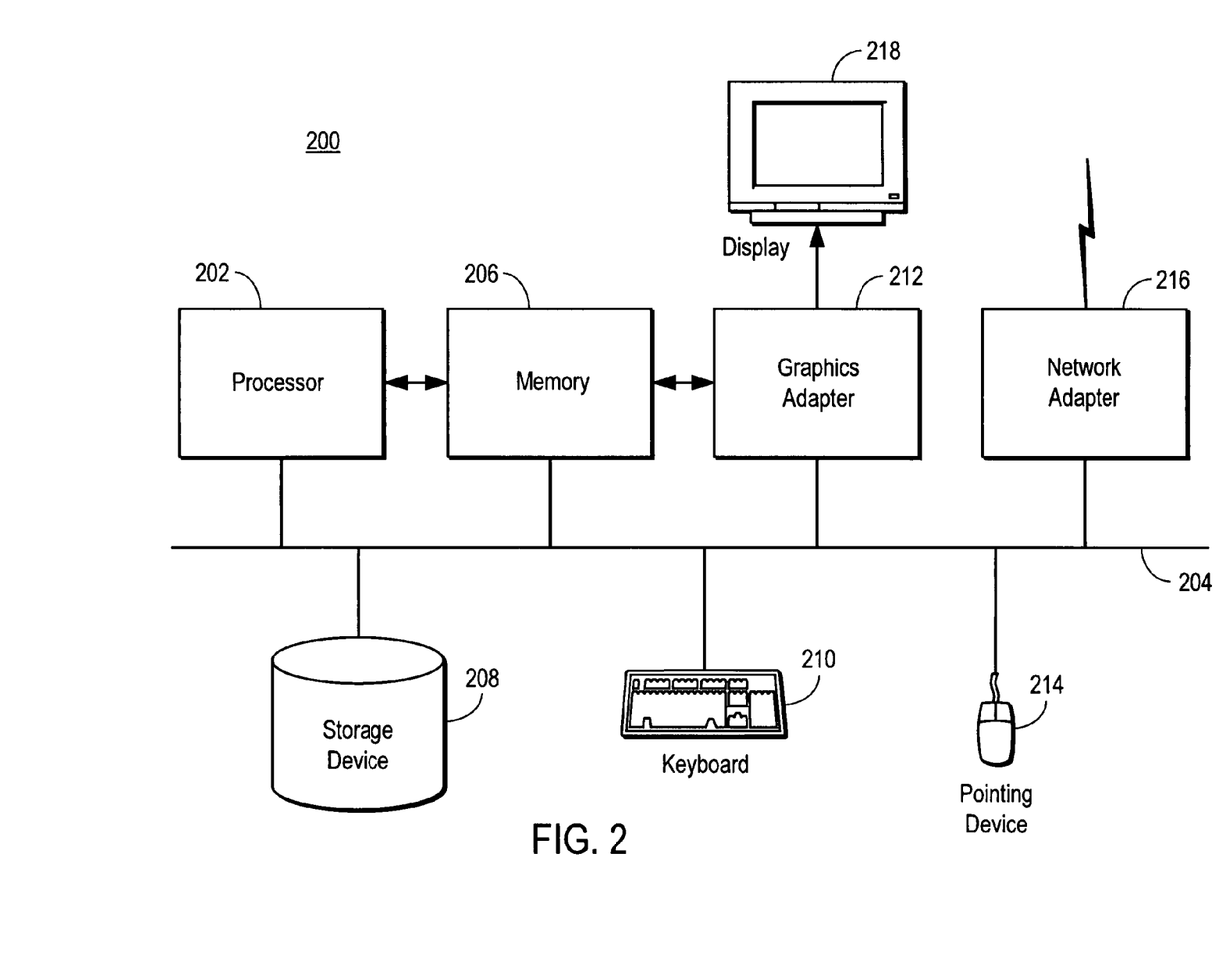
FIG. 2 is a block diagram illustrating a computer that can serve as an embodiment of a software provider server or a host computer, in one embodiment.

FIG. 2 is a block diagram illustrating a computer 200 that can serve as an embodiment of a software provider server 102 or a host computer 108, in one embodiment. Illustrated are at least one processor 202 coupled to a bus 204. Also coupled to the bus are a memory 206, a storage device 208, a keyboard 210, a graphics adapter 212, a pointing device 214, and a network adapter 216. A display 218 is coupled to the graphics adapter 212. The storage device 208 is a device such as a hard drive, CD or DVD drive, or flash memory device, and holds files containing executable code and/or data utilized during the operation of the computer 200. The storage device 208 comprises a computer readable storage medium. The memory 206, in one embodiment, is a random access memory (RAM) and holds instructions and data loaded from the storage device 208, generated during processing, and/or from other sources.

Computers acting in different roles may have different and/or additional elements than the ones shown in FIG. 2. For example, a computer 200 acting as a software provider server 102 may have greater processing power and a larger storage device than a computer acting as a host computer 108. Likewise, a computer 200 acting as a software provider server 102 may lack devices such as a display 218 and/or keyboard 210 that are not necessarily required to operate it.

The computer 200 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 208, loaded into the memory 206, and executed by the processor 202. A module can include one or more processes, and/or be provided by only part of a process.

Figure 3:
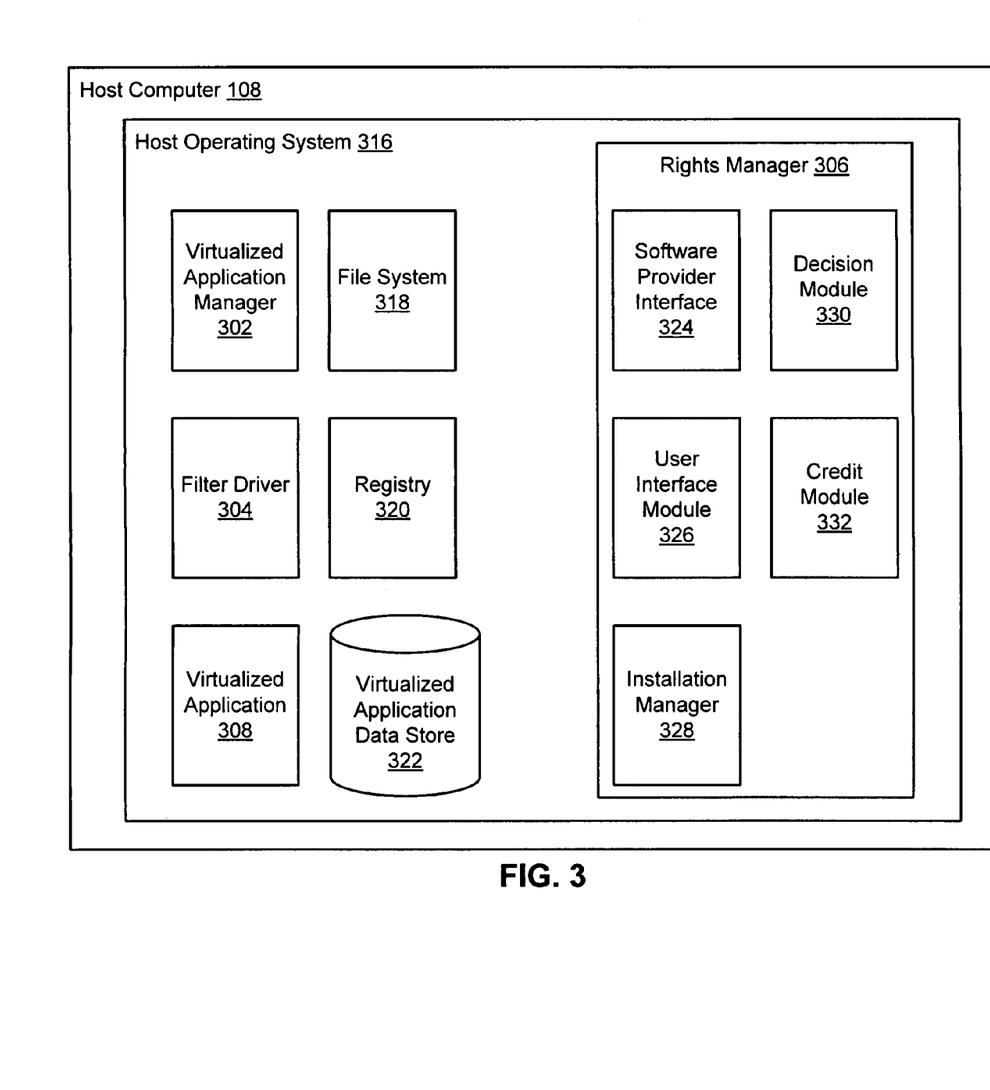
FIG. 3 illustrates a logical view of a computing environment provided by the host computer for executing software applications with limited rights, in one embodiment.

FIG. 3 illustrates a logical view of a computing environment provided by the host computer 108 for executing software applications with limited rights, in one embodiment. A host operating system 316 executes on the processor 202 of the host computer 108. The host operating system 316 can be a standard operating system such as a version of WINDOWS VISTA. The host operating system 316 can run user applications and has a file system 318 that includes files stored on the storage device 208. The file system 318 stores files used by the host operating system 316 and by user applications. The host operating system 316 can also include a registry 320 containing configuration settings for the host operating system and user applications. The settings in the registry 320 may be stored as keys organized in a hierarchical format.

The virtualized application manager 302, filter driver 304, and virtualized application data store 322 provide light weight virtualization capabilities to the host operating system 316 and enable the execution of virtualized applications 308. Light weight virtualization comprises a software stack that uses the computing resources of the host computer 108 up to and including the host operating system 316. With light weight virtualization technology, virtualized applications 308 are isolated from other virtualized applications, user applications, and the host operating system 316. This allows virtualized applications 308 to be easily disabled or removed from the host computer 108 when software usage rights indicate that such action should be taken. Examples of light weight virtualization technology are Altiris Software Virtualization Solution (SVS) and Symantec Workspace Virtualization (SWV). The virtualized application manager 302 and filter driver 304 may be provided separately from the host operating system 316 and installed in the host operating system by a user or administrator of the host computer 108.

The filter driver 304 intercepts attempts by virtualized applications 308 to modify the file system 318 and registry 320. Instead of allowing virtualized applications 308 to modify the actual file system 318 and registry 320, the modifications are stored by the filter driver 304 in the virtualized application data store 322. In one embodiment, modifications for each virtualized application 308 are stored separately in the virtualized application data store 322 from other virtualized applications. The filter driver 304 also intercepts attempts by virtualized applications 308 to read from the file system 318 and registry 320. If the filter driver 304 determines that the virtualized application 308 is attempting to read a file or registry setting that the virtualized application has previously modified, the filter driver redirects the read attempt to the virtualized application data store 322. Otherwise, the filter driver 304 can allow the virtualized application to read from the actual file system 318 or registry 320.

The filter driver 304 also intercepts attempted changes to the file system 318 and registry 320 when the virtualized application 308 itself is installed in the host operating system 316 by the virtualized application manager 302, as described below. For example, the executable files and configuration files associated with the virtualized application 308 are stored in the virtualized application data store 322 rather than directly in the file system 318.

As a result of the redirection performed by the filter driver 304, the virtualized application is able to operate, from its point of view, as a normal user application and modify the file system 318 and registry 320. However, from the point of view of the host operating system 316 and user applications and other virtualized applications, the virtualized application 308 does not make any changes to the file system 318 or registry 320. For example, a virtualized application 308 may successfully execute a system call to write to a file in the "C:\WINDOWS" directory, but this write is actually made to the virtualized application data store 322. Since the redirection is transparent to the virtualized application 308, standard software can be run as a virtualized application without special modifications by the software developer.

The virtualized application data store 322 is used to store any attempted modifications to the file system 318 or registry 320 during the installation or execution of a virtualized application 308, as described above. The virtualized application data store 322 may be contained within the file system 318 or may be in a separate portion of the storage device 208 of the host computer 108. If it is contained within a file system 318, it may be located in a special area of the file system so that it does not interfere with the normal functioning of the host operating system 316 and is not easily visible to users. In one embodiment, users are not given permissions to directly view or modify the virtualized application data store 322. The virtualized application data store 322 may contain a complete copy of the file system 318 and registry 320 for each virtualized application 308, or may use more efficient methods that store only modifications to the file system 318 and registry 320 by each virtualized application. The modifications made by each virtualized application 308 can be stored separately so that virtualized applications do not interfere with each other.

The virtualized application manager 302 manages virtualized applications, including installing, removing, enabling, and disabling virtualized applications. The virtualized application manager 302 may receive commands for performing these actions from the rights manager 306, as described below. In one embodiment, the virtualized application manager 302 receives files needed for installing a virtualized application 308 and scripts or configuration files for performing the installation. The virtualized application manager 302 installs the application as a virtualized application 308 so that the application is installed in the virtualized application data store 322 rather than directly in the file system 318 and so that the application is configured to access the file system 318 and registry 320 through the filter driver 304.

Once a virtualized application 308 has been installed, it can be enabled by the virtualized application manager 302. When a virtualized application 308 is enabled, it is made visible to a user of the host computer 108 and can be launched as a normal application from the user's point of view. For example, enabling a virtualized application 308 causes the files associated with the virtualized application to be visible to the user in the file system 318 at their non-virtualized locations as links to the actual files in the virtualized application data store 322. The non-virtualized locations are locations within the file system where the files of the application would normally have been installed if the application were not installed as a virtualized application. For example, a non-virtualized location is "C:\Program Files\[Application Name]". The virtualized application manager 302 can also disable a virtualized application 308, removing it from view of the user and preventing the user from executing it. To do this, links from the file system 318 can be deleted so that the application files in the virtualized application data store 322 cannot be accessed by the user.

The virtualized application manager 302 can also remove a virtualized application 308 from the host computer 108 by deleting data related to the virtualized application from the virtualized application data store 322. Since the footprint of the virtualized application 308 is confined to the virtualized application data store 322, it is relatively simple to remove a virtualized application, including reversing any attempted modifications to operating system files or registry settings made by the virtualized application.

In one embodiment, a rights manager 306 installed in the host operating system cooperates with the virtualized application manager 302 to enforce usage rights associated with software applications. The rights manager 306 may be created by a software provider and provided by the software provider server 102. The rights manager 306 may control the usage of multiple software applications installed as virtualized applications 308 on the host computer 108 that are associated with the same software provider. There may also be multiple rights managers 306 installed on the host computer 108 if there are software applications installed as virtualized applications 308 from multiple different software providers installed on the host computer 108.

A software provider may require that a user install the software provider's rights manager 306 prior to installing any limited-use software. In one embodiment, the rights manager 306 can be automatically retrieved and installed when a user attempts to install a limited-use software application without having the software provider's rights manager already installed. In one embodiment, the rights manager 306 is installed as a service (e.g., a Windows service or Linux daemon) so that it is constantly running in the background. The rights manager 306 may also be installed as a standard user or system application that is instantiated when needed.

In one embodiment, the rights manager 306 may be installed as a virtualized application by the virtualized application manager 302. Installing the rights manager 306 as a virtualized application may beneficially make the rights manager less likely to be tampered with by users and less likely to interfere with the operation of the host operating system 316 in unintended ways. In the description below, a mention of a "virtualized application" refers to limited-use software installed as a virtualized application 308, not the rights manager 306 (even if installed as a virtualized application).

The installation manager 328 of the rights manager 306 manages the installation and initialization of limited-use software applications. In one embodiment, the installation manager 328 receives a package containing files and scripts needed for installing a limited-use software application as a virtualized application 308. The package may be received from the software provider server 102. The software provider may also distribute the package for downloading through online stores or shareware websites. The package may be encrypted and may include a digital certificate. The installation manager 328 can decrypt the package and process the digital certificate. The package may also include a specification of the usage rights (e.g., a 30-day trial) of the software application. The installation manager 328 can provide the specification to the decision module 330, further described below, for controlling the usage of the software application.

The installation module 328 provides the received installation files and scripts to the virtualized application manager 302 for installation of the software application on the host computer as a virtualized application 308. In one embodiment, after installation is complete, the installation manager 328 queries the decision module 330 to determine whether the virtualized application 308 should be initially enabled or disabled, and the installation manager commands the virtualized application manager 302 to enable or disable the virtualized application, as appropriate. In one embodiment, the installation manager 328 installs the virtualized application 308 such that, whenever a user attempts to launch the virtualized application (e.g., by clicking on a desktop shortcut), the decision module 330 is queried to determine whether the virtualized application should be enabled and permitted to execute or whether other action should be taken such as disabling the virtualized application or presenting a user interface screen.

The installation manager 328 can also be used to install an unlimited-use version of a software application, such as a full version of the application purchased by a user after trying a limited-use version. An unlimited use version can be installed as a standard (non-virtualized) application or as a virtualized application 308 that is always enabled.

The software provider interface 324 enables the rights manager 306 to communicate with the software provider server 102 over the network 106. The software provider interface 324 can query the software provider server 102 to determine whether a user currently has rights to execute a particular virtualized application 308 containing software from the software provider. The software provider interface 324 can also send usage data associated with the application to the software provider server 102, such as the number of times the user executed the application. This can allow the software provider to track and analyze usage of its software. The software provider interface 324 can also send information about a user to the software provider server for verification or software purchases. For example, the user interface module 326 can collect a user's name, address, and credit card payment information, and the software provider interface 324 can send this information to the software provider server 102 for payment processing.

The user interface module 326 can display messages to a user attempting to execute a virtualized application 308 and can collect information from a user. In one embodiment, if a user is attempting to execute a virtualized application 308 comprising shareware, the user interface module 326 can display a window identifying the application as shareware, displaying the number of days of free usage remaining, and providing a button that the user can select to purchase the full version of the software. For a pay-per-use application, a window can be displayed showing how many pay-per-use credits the user has remaining. For a subscription-based application, the window can display the status of the user's subscription. The user interface module 326 can also collect information from the user for purchasing a full version of the software, for purchasing pay-per-use credits, or for purchasing or extending a subscription.

The decision module 330 determines whether a virtualized application 308 is permitted to execute based on the usage rights associated with the application. The decision module 308 can take various actions such as commanding the virtualized application manager 302 to enable a virtualized application 308 or to disable a virtualized application. The decision module 330 can also cause the user interface module 326 to display a particular message to the user. In one embodiment, the decision module 308 makes a decision about a virtualized application 308 each time a user attempts to execute the virtualized application. In one embodiment, the decision module 330 is activated periodically, such as once every day, to determine which virtualized applications 308 should be enabled or disabled.

In one embodiment, the decision module 330 can decide on an action to take regarding a virtualized application 308 based on the specification of usage rights provided in the package containing the software application. For example, the specification may state that the application should be enabled for 30 days after installation, and that each time the application is executed, a window should be displayed to the user asking if the user would like to purchase the software. The specification may further state that after 30 days, the application should be disabled and a window should be displayed requiring the user to purchase the software.

The decision module 330 can implement this specification by commanding the virtualized application manager 302 to enable the virtualized application 308 containing the software after it is installed. Each time the application is executed, the decision module 330 can cause the user interface module 326 to display a message offering the software for purchase. After thirty days have elapsed, the decision module 330 can command the virtualized application manager 302 to disable the virtualized application 308. If the user attempts to start the virtualized application 308 after that point, the decision module 330 can cause the user interface module 326 to display a window indicating that a purchase is required to continue using the software. Once the virtualized application 308 has been disabled, it is not visible in the file system 318 and cannot be accessed by the user.

In addition to or instead of using a specification of usage rights provided to the rights manager, the decision module 330 can query the software provider server 102 to determine the current usage rights associated with a software application. This may be particularly useful if the software application has subscription-based or pay-per-use usage rights. For a subscription-based application, the decision module 330 can query the software provider server 102 to determine whether the subscription is current or expired. If the software provider server 102 indicates that the subscription is expired, the decision module 330 can disable the virtualized application 308 and cause the user interface module 326 to ask the user to make a subscription payment. The user can provide payment information that is sent to the software provider server 102. If the payment information is accepted, the software provider server 102 can notify the rights manager 306 that the subscription is now current, and the decision module 330 can issue a command to enable the virtualized application 308.

The credit module 332 can cooperate with the decision module 330 to manage pay-per-use software applications. In one embodiment, the software provider requires a user to purchase a credit for a particular unit of use of the software application. For example, the user can purchase 10 credits to execute the application 10 times or on 10 different days. When the decision module 330 needs to determine whether to enable the application, the credit module 330 may query the software provider server 102 which maintains a credit count for the user. The software provider server 102 can respond indicating whether or not the user has enough credits. If the user has enough credits, the decision module 330 can enable the virtualized application 308, and the software provider server 102 can decrement its credit count for the user. If the user does not have enough credits, the user interface module 326 can present a credit purchase screen to the user. In one embodiment, a screen is always displayed to the user indicating the number of credits remaining and requesting the user's permission to use a credit to enable and execute the application.

In one embodiment, the credit module 332 may maintain a local copy of a user's current credit count on the host computer 108 that is synchronized with the credit count maintained by the software provider server 102. In this embodiment, the credit module 332 can either query the software provider server 102 or use the local credit count to determine whether the user has enough credits. An advantage of this approach is that it allows a user to execute a pay-per-use application even if the host computer is not currently connected to a network 106, or if the network or the software provider server 102 is currently down. In one embodiment, the user is permitted to use a small number of credits based on the local credit count. After that point, a connection to the software provider server 102 is required for the user to execute the software again. When the connection is made, the local credit count and the credit count maintained by the software provider server 102 are re-synchronized. By limiting the number of credits that can be used when offline, the effects of any tampering with the local credit count by a user is limited.

Figure 4:
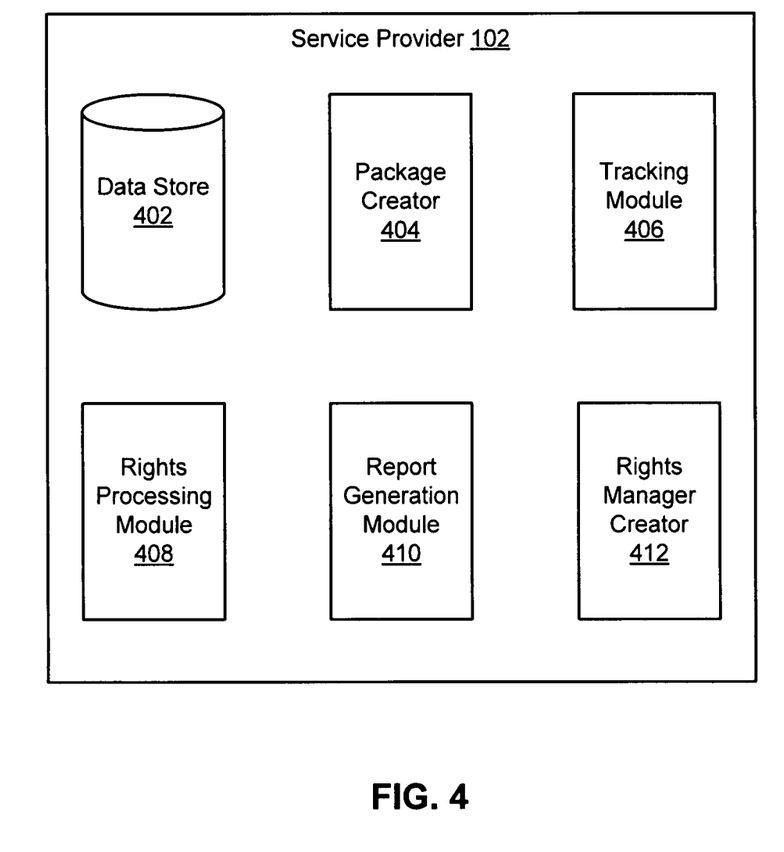
FIG. 4 illustrates a logical view of a computing environment provided by the software provider server for deploying and controlling limited-use software, in one embodiment.

FIG. 4 illustrates a logical view of a computing environment provided by the software provider server 102 for deploying and controlling limited-use software, in one embodiment. As mentioned above, the software provider server 102 may be operated by a software provider that desires to provide software to a user at a host computer 108 on a trial, subscription, or pay-per-use basis. The software provider server 102 may be used to deploy and control multiple software applications on multiple host computers 108.

The package creator 404 is used by the software provider to create packages for installation and execution by the installation manager 328 and virtualized application manager 302. As mentioned above, the software provider can develop and test a software application without being concerned about installation and virtualization details. The software provider can then use the package creator 404 to create a package containing the application files. The package creator 404 can also include tools for creating installation scripts, creating a usage rights specification, and creating a digital certificate for inclusion in the package. An example of a portion of a package creator 404 is Wise Package Studio by Symantec Corporation. In one embodiment, self-executing packages can be created.

The rights processing module 408 responds to queries from rights managers 306 at various host computers 108 requesting the current status of usage rights associated with a particular user and virtualized application 308. The rights processing module 408 obtains usage rights information from the data store 402 and provides it to a rights manager 306 so that the rights manager can enable a virtualized application 308 or take other appropriate action. The rights processing module 408 can also be contacted by a rights manager 306 when a user desires to update their usage rights (e.g., by purchasing a new subscription or pay-per-use credits). The rights processing module 408 can process payment information and notify that the rights manager 306 of the new usage rights associated with the user. The rights processing module 408 can update the current usage rights for the user stored in the data store 402.

The data store 402 stores information about various deployments of limited-use software at host computers 108. For example, for each deployed virtualized application 308, the following information can be stored: name/identification of application, IP address of host computer, information about a user associated with the application (e.g., name, address, payment information), record of usage of the application, and current usage rights for the application. The record of usage is discussed further below. The current usage rights for the application may include the current date of expiration of a trial period or paid monthly subscription, or the number of remaining credits for a pay-per-use application, for example. In one embodiment, the data store 402 is accessed by the rights processing module 408, the tracking module 406, and the report generation module 410.

The tracking module 406 tracks the usage of rights-limited software applications on host computers 108. In one embodiment, the rights manager 306 (or the virtualized application manager 302) notifies the tracking module 406 of actions taken by a user involving a virtualized application. These actions may include installing a virtualized application 308, executing the application, removing the application, using or purchasing credits, making a subscription payment, or purchasing the virtualized application. The tracking module 406 can store this information in the data store 402 as the record of usage for a virtualized application.

The report generation module 410 can access the data stored in the data store 402 to generate reports for analysis or planning purposes. These reports can describe the overall usage of various applications by the host computers 108, and can describe current trial, subscription, or credit status associated with the applications. Various analyses can be performed using the reports, such as determining the common patterns of usage of trial software of users who eventually decide to purchase the software as opposed to users who do not. The results of the analysis can be used to optimize various parameters such as trial period lengths and subscription or purchase prices, for example. The analysis can also identify the length of time that particular users have been using the applications under various usage types (e.g., pay-per-use vs. subscription).

The rights manager creator 412 can be used to create a rights manager 306. Most of the code in a particular rights manager 306 can be common to all rights managers so that each software provider does not need to develop this code. The rights manager creator 412 can allow the software provider to customize the rights manager code, such as by specifying particular messages to be displayed by the user interface module. The rights manager creator 412 can also create a rights processing module 408 capable of communicating with the rights manager.

Figure 5:
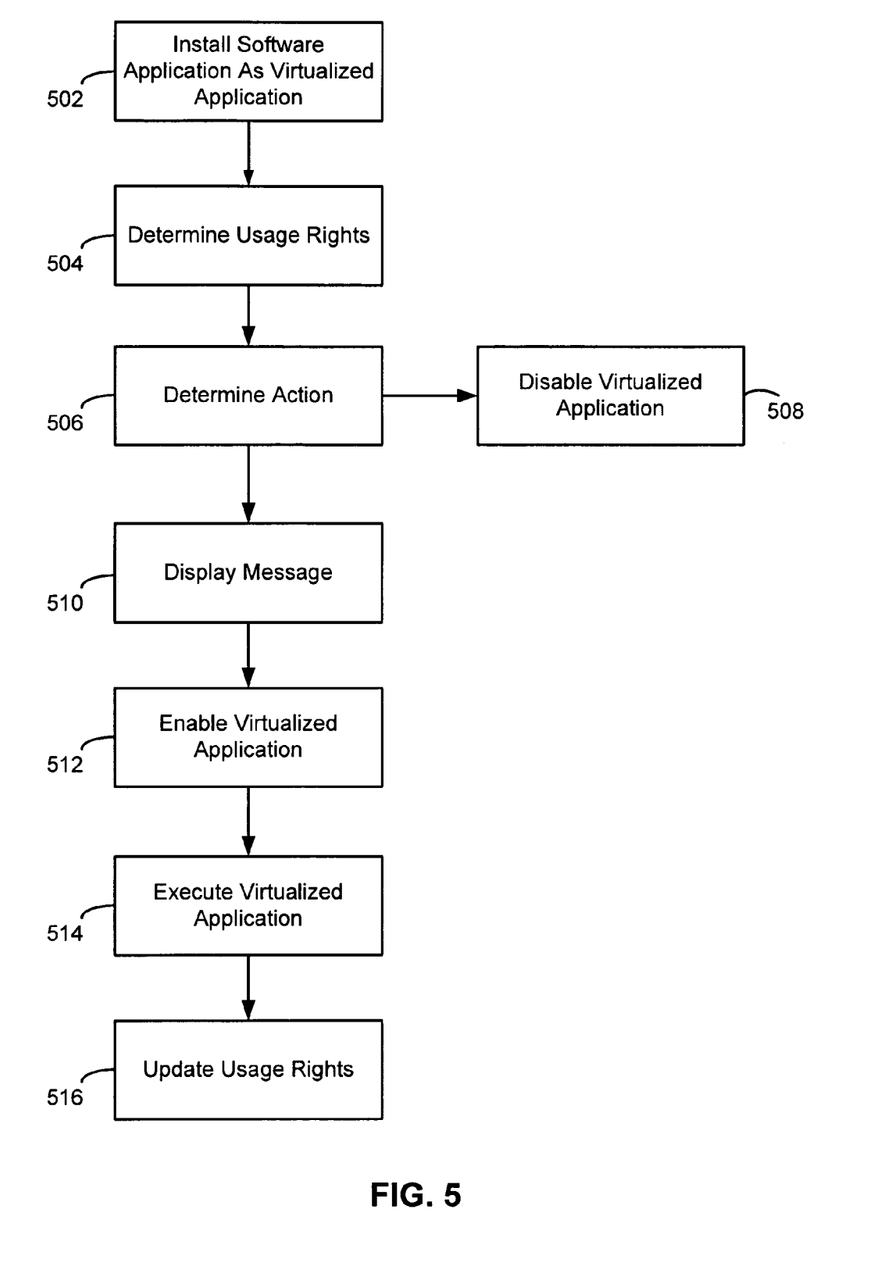
FIG. 5 is a flowchart illustrating a method for managing limited-use software on a host computer, in one embodiment.

FIG. 5 is a flowchart illustrating a method for managing limited-use software on a host computer 108, in one embodiment. A software application with limited-use software rights is installed 502 on the host computer as a virtualized application 308. The application can be received as a package and installed by the installation manager 328 and virtualized application manager 302. The rights manager 306 then determines 504 the usage rights associated with the software. This determination can be made in response to a user requesting to execute the application or the determination can be made periodically. The usage rights can be determined based on a usage rights specification provided along with the software application or can be determined based on a query to the software provider server 102 by the software provider interface 324.

The decision module 330 then determines 506 an action to take based on the current usage rights. This action may involve enabling 512 the virtualized application 308, disabling 508 the virtualized application, or displaying 510 a message to the user. More than one action may be taken, such as displaying 510 a message and then enabling 512 the virtualized application 308. The virtualized application 308 can be enabled 512 or disabled 508 by sending a command to the virtualized application manager 302. A message to the user, such as a message concerning the near expiration of the user's subscription, can be displayed 510 by the user interface module 326. If enabled, the virtualized application 308 can be executed 514 and used by the user. In one embodiment, the usage rights for the software application are updated 516 by the rights manager 306. For example, the credit module 332 and the software provider server 102 can decrement a credit count associated with a pay-per-use application each time the application is executed.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A computer-implemented method for managing limited-use software on a host computer, comprising:
   receiving usage rights information for a limited-use software application installed in a virtualized application data store on the host computer as a virtualized application using light weight virtualization, the usage rights information comprising a rule describing permitted use of the software application installed on the host computer;
   determining whether to enable or disable the installed virtualized application, the determination based at least in part on the usage rights information;
   responsive to determining to enable the installed virtualized application, making the installed virtualized application executable on the host computer by causing files of the installed virtualized application to be visible at their non-virtualized locations within a file system of an operating system of the host computer; and
   responsive to determining to disable the installed virtualized application, making the installed virtualized application non-executable on the host computer by causing the files of the virtualized application to not be visible at their non-virtualized locations within the file system of the operating system of the host computer and maintaining files of the installed virtualized application in the virtualized application data store on the host computer.

2. The computer-implemented method of claim 1, wherein the rule describes a specific number of days of permitted use of the installed software application, and wherein the installed virtualized application is enabled for the specific number of days.

3. The computer-implemented method of claim 1, wherein the rule describes a pay-per-use scheme comprising a number of credits required to use the installed software application, and wherein determining whether to enable the installed virtualized application comprises determining whether a user has sufficient credits.

4. The computer-implemented method of claim 1, further comprising:
   receiving payment information from a user, and
   wherein the determination whether to enable the installed virtualized application is based at least in part on the payment information.

5. The computer-implemented method of claim 1, further comprising:
   determining tracking information, the tracking information describing usage of the installed virtualized application and results of determinations whether to enable the installed virtualized application;
   sending tracking information to a software provider server.

6. The computer-implemented method of claim 1, wherein causing files of the installed virtualized application to be visible comprises causing the files to be visible as links to the files in the virtualized application data store, and wherein the non-virtualized locations within a file system comprise locations within the file system where the files of the application would have been installed if the application had been installed as a non-virtualized application.

7. The computer-implemented method of claim 1, wherein causing files of the installed virtualized application to not be visible comprises removing the links to the files in the virtualized application data store from the file system.

8. A computer system for managing limited-use software on a host computer, the system comprising:
a computer-readable storage medium storing executable computer program modules comprising a rights manager for:
receiving usage rights information for a limited-use software application installed in a virtualized application data store on the host computer as a virtualized application using light weight virtualization, the usage rights information comprising a rule describing permitted use of the software application installed on the host computer;
determining whether to enable or disable the installed virtualized application, the determination based at least in part on the usage rights information;
responsive to determining to enable the installed virtualized application, making the installed virtualized application executable on the host computer by causing files of the installed virtualized application to be visible at their non-virtualized locations within a file system of an operating system of the host computer; and
responsive to determining to disable the installed virtualized application, making the installed virtualized application non-executable on the host computer by causing the files of the virtualized application to not be visible at their non-virtualized locations within the file system of the operating system of the host computer and maintaining files of the installed virtualized application in the virtualized application data store on the host computer.

9. The computer system of claim 8, wherein the rule describes a pay-per-use scheme comprising a number of credits required to use the installed software application, and wherein determining whether to enable the installed virtualized application comprises determining whether a user has sufficient credits.

10. The computer system of claim 8, wherein the rights manager is further configured for:
receiving payment information from a user, and
wherein the determination whether to enable the installed virtualized application is based at least in part on the payment information.

11. The computer system of claim 8, wherein the rights manager is further configured for:
determining tracking information, the tracking information describing usage of the installed virtualized application and results of determinations whether to enable the installed virtualized application;
sending tracking information to a software provider server.

12. The computer system of claim 8, wherein causing files of the installed virtualized application to be visible comprises causing the files to be visible as links to the files in the virtualized application data store, and wherein the non-virtualized locations within a file system comprise locations within the file system where the files of the application would have been installed if the application had been installed as a non-virtualized application.

13. The computer system of claim 8, wherein causing files of the installed virtualized application to not be visible comprises removing the links to the files in the virtualized application data store from the file system.

14. A computer program product having a computer-readable storage medium having executable computer program instructions recorded thereon for managing limited-use software on a host computer, comprising a rights manager for:
receiving usage rights information for a limited-use software application installed in a virtualized application data store on the host computer as a virtualized application using light weight virtualization, the usage rights information comprising a rule describing permitted use of the software application installed on the host computer;
determining whether to enable or disable the installed virtualized application, the determination based at least in part on the usage rights information;
responsive to determining to enable the installed virtualized application, making the installed virtualized application executable on the host computer by causing files of the installed virtualized application to be visible at their non-virtualized locations within a file system of an operating system of the host computer; and
responsive to determining to disable the installed virtualized application, making the installed virtualized application non-executable on the host computer by causing the files of the virtualized application to not be visible at their non-virtualized locations within the file system of the operating system of the host computer and maintaining files of the installed virtualized application in the virtualized application data store on the host computer.

15. The computer program product of claim 14, wherein the rule describes a specific number of days of permitted use of the installed software application, and wherein the installed virtualized application is enabled for the specific number of days.

16. The computer program product of claim 14, wherein the rule describes a pay-per-use scheme comprising a number of credits required to use the installed software application, and wherein determining whether to enable the installed virtualized application comprises determining whether a user has sufficient credits.

17. The computer program product of claim 14, wherein the rights manager is further configured for:
receiving payment information from a user, and
wherein the determination whether to enable the installed virtualized application is based at least in part on the payment information.

18. The computer program product of claim 14, wherein the rights manager is further configured for:
determining tracking information, the tracking information describing usage of the installed virtualized application and results of determinations whether to enable the installed virtualized application;
sending tracking information to a software provider server.

19. The computer program product of claim 14, wherein causing files of the installed virtualized application to be visible comprises causing the files to be visible as links to the files in the virtualized application data store, and wherein the non-virtualized locations within a file system comprise locations within the file system where the files of the application would have been installed if the application had been installed as a non-virtualized application.

20. The computer program product of claim 14, wherein causing files of the installed virtualized application to not be visible comprises removing the links to the files in the virtualized application data store from the file system.

* * * * *